United States Patent [19]

Martz et al.

[11] Patent Number: 4,997,882
[45] Date of Patent: Mar. 5, 1991

[54] ACID OR ANHYDRIDE GRAFTED CHLORINATED POLYOLEFIN REACTED WITH MONOALCOHOL AND POLYEPOXIDE

[75] Inventors: Jonathan T. Martz, Glenshaw; James B. O'Dwyer, Valencia; Marvis E. Hartman, Pittsburgh, all of Pa.

[73] Assignee: PPG Industries, Inc., Pittsburgh, Pa.

[21] Appl. No.: 376,441

[22] Filed: Jul. 7, 1989

[51] Int. Cl.$^5$ .................. C08G 8/14; C08G 259/2
[52] U.S. Cl. .................................. 525/65; 523/436
[58] Field of Search ................................ 525/65

[56] References Cited

U.S. PATENT DOCUMENTS 4,683,264  7/1987  Urata et al. ........................ 525/65

FOREIGN PATENT DOCUMENTS

| 0238327 | 9/1987 | European Pat. Off. .......... 525/65 |
| 3713120 | 10/1987 | Fed. Rep. of Germany . |
| 3713120A1 | 10/1987 | Fed. Rep. of Germany . |
| 2131439 | 6/1984 | United Kingdom . |
| 2131439A | 6/1984 | United Kingdom . |
| 2157699A | 10/1985 | United Kingdom . |
| 2131439B | 3/1986 | United Kingdom . |
| 2157699B | 7/1987 | United Kingdom . |

Primary Examiner—Allan M. Lieberman
Assistant Examiner—Robert E. L. Sellers, II
Attorney, Agent, or Firm—William J. Uhl; Thomas M. Breininger

[57] ABSTRACT

Disclosed is an ungelled, modified chlorinated polyolefin resin suitable for providing a highly adherent, solvent resistant film on a thermoplastic polyolefin substrate. The modified chlorinated polyolefin resin is prepared by grafting an unsaturated polycarboxylic acid and/or an unsaturated acid anhydride onto a chlorinated polyolefin resin to form an acid- and/or anhydride-modified chlorinated polyolefin resin. The resulting acid- and/or anhydride-modified chlorinated polyolefin resin is reacted with an organic monohydric alcohol to form an esterified product containing acid functionality. The resulting esterified product is reacted with a polyepoxide to form the ungelled modified chlorinated polyolefin resin.

Also disclosed is a method of preparing an ungelled modified chlorinated polyolefin resin of the invention, a coating composition containing a resin of the invention, and a method of forming a hardened film from the coating composition on a thermoplastic polyolefin substrate.

7 Claims, No Drawings

ACID OR ANHYDRIDE GRAFTED CHLORINATED POLYOLEFIN REACTED WITH MONOALCOHOL AND POLYEPOXIDE

BACKGROUND OF THE INVENTION

Thermoplastic polyolefin substrates are widely used in parts for automotive vehicles, container caps and containers for cosmetics, household appliances as well as in other applications. Often, organic coating compositions are applied to such polyolefin substrates for decorative as well as protective purposes. However, an ongoing problem with respect to such use of these substrates has been the difficulty in achieving adequate adhesion of organic films to the thermoplastic polyolefin. The problems are particularly difficult in automotive vehicle applications where, in addition to the requirement that decorative and protective coatings adhere well to the polyolefin substrate, there are other requirements which are very difficult to achieve in respect to utilization of thermoplastic polyolefin substrates, such as requirements for a high degree of resistance of the finally coated part to organic solvents (e.g., gasoline) and a high degree of resistance of any hardened coating to humidity.

A number of proposals have been made for overcoming the adhesion problem ranging from subjecting the polyolefin substrate to corona discharge to the application of various primer compositions to the substrate for improving adhesion of organic coatings thereto. However, while such proposed techniques have achieved a fair measure of success with respect to the adhesion problem, there remain various disadvantages such that the goal, for example, of achieving a desired combination of excellent adhesion, solvent resistance and humidity resistance in an advantageously economic manner has remained elusive. For example, one such proposal described in U.S. Pat. No. 4,683,264 involves use of a hardenable coating composition containing a polyolefin resin which has been first reacted with an unsaturated polycarboxylic acid or anhydride to produce an intermediate, modified polyolefin product having a saponification value (acid value) in the range of from 6 to 60 which intermediate product is subsequently chlorinated to a specified degree. Thereafter, the chlorinated product is formulated with a compound or resin having at least two epoxy groups per molecule in a specified ratio.

SUMMARY OF THE INVENTION

The present invention provides an ungelled, modified chlorinated polyolefin resin suitable for providing a highly adherent, solvent resistant film on a thermoplastic polyolefin substrate. The modified chlorinated polyolefin resin is prepared by grafting, typically free radically grafting, one or more compounds selected from unsaturated polycarboxylic acids and their acid anhydrides onto a chlorinated polyolefin resin to form an acid-and/or anhydride-modified chlorinated polyolefin resin. Acid and/or anhydride groups of the resulting acid- and/or anhydride-modified chlorinated polyolefin resin are reacted with OH (hydroxyl) functionality from an organic monohydric alcohol to form an esterified product containing acid functionality. Acid functionality of the resulting esterified product is reacted with epoxy functionality from a polyepoxide in relative amounts as specified below to form the ungelled modified chlorinated polyolefin resin of the invention.

The present invention also provides a method of modifying a chlorinated polyolefin resin to form an ungelled modified chlorinated polyolefin resin of the invention.

The present invention also provides a coating composition comprising, and for some embodiments consisting essentially of, an ungelled modified chlorinated polyolefin resin of the invention.

The present invention also provides a method of coating comprising: (I) applying to a thermoplastic polyolefin substrate, a film of coating composition of the invention containing ungelled modified chlorinated polyolefin resin of the invention; and (II) hardening the film on the thermoplastic polyolefin substrate to provide an adherent, organic solvent resistant and humidity resistant coating.

The present invention also provides a thermoplastic polyolefin substrate having directly adhered to a surface thereof, a hardened film from a coating composition of the invention.

DETAILED DESCRIPTION OF THE INVENTION

An ungelled, modified chlorinated polyolefin resin of the present invention is suitable for providing a highly adherent, solvent and humidity resistant film on a thermoplastic polyolefin substrate. The modified chlorinated polyolefin resin can be prepared by grafting, typically free radically grafting, one or more compounds selected from unsaturated polycarboxylic acids and their acid anhydrides onto an already chlorinated polyolefin resin to form an acid- and/or anhydride-modified chlorinated polyolefin resin. Acid and/or anhydride groups of the resulting acid-and/or anhydride-modified chlorinated polyolefin resin are reacted with OH (hydroxyl) functionality from an organic monohydric alcohol, preferably a $C_3$–$C_{18}$ monohydric alcohol, to form an esterified product containing acid functionality. As can be appreciated from Example 6 infra, utilization of a very low molecular weight monohydric alcohol such as ethanol may result in the very low molecular weight alcohol not reacting fully with the anhydride-modified chlorinated polyolefin because of solubility parameters and may tend to promote a disadvantageous increase in viscosity and/or premature gellation of the reaction mixture during preparation of the modified chlorinated polyolefin resin.

Acid functionality of the resulting esterified product is reacted with epoxy functionality from a polyepoxide, preferably a diepoxide, to form the ungelled modified chlorinated polyolefin resin of the invention. The polyepoxide and the unsaturated polycarboxylic acid and/or anhydride for preparation of the ungelled, modified chlorinated polyolefin resin are utilized in amounts to provide a ratio of equivalents of epoxy groups to equivalents of acid groups in the range of from 5.0:1.0 to 1.5:1.0.

Chlorinated polyolefin resins suitable for preparing an ungelled modified chlorinated polyolefin resin of the invention are known in the art. Typically, a chlorinated polyolefin for the present invention contains about 5 to 75 percent by weight of chlorine and typically has a number average molecular weight of about 5,000 to about 50,000. For example, chlorinated polypropylene can be readily prepared by solution, melt, or solid polymer chlorination at moderate to high temperatures according to well-known techniques as reviewed, for example, in Raff and Doak, "Crystalline Olefin Polymers II," p. 239, Interscience Publishers, New York, N.Y., 1964. Chlorinated polymeric materials suitable for the composition and method of the present invention are available commercially from Eastman Chemical Products, Rochester, N.Y.

As set forth above, the already chlorinated polyolefin resin is reacted with an unsaturated polycarboxylic acid and/or acid anhydride to form an acid- and/or anhydride-modified chlorinated polyolefin resin. Typically the unsaturated acid and/or anhydride is reacted with the chlorinated polyolefin resin in the presence of a free radical initiator, examples of which include: azo compounds such as, for example, alpha alpha'-azobis-(isobutyronitrile); peroxides such as benzoyl peroxide, tertiary-butyl hydroperoxide and cumene hydroperoxide; and tertiary butyl peracetate, isopropyl percarbonate, butyl isopropyl peroxy carbonate and similar compounds. The quantity of initiator employed can be varied considerably; however, in most instances, it is desirable to utilize from about 0.1 to about 10 percent based on the sum of the weights of chlorinated polyolefin resin and unsaturated polycarboxylic acid and/or anhydride. Thus, while not intending to be bound thereby, it is believed that the unsaturated acid and/or anhydride becomes grafted onto the chlorinated polyolefin resin via a free radical grafting mechanism.

Typically ethylenically unsaturated dicarboxylic acids or anhydrides thereof are utilized as the unsaturated acid or anhydride component. Examples of unsaturated polycarboxylic acids and/or anhydrides suitable for reaction with the chlorinated polyolefin resin include: maleic acid, maleic anhydride, fumaric acid itaconic acid and itaconic anhydride, maleic anhydride being preferred. Typically, the relative amounts of chlorinated polyolefin resin and unsaturated polycarboxylic acid and/or acid anhydride are chosen such that following reaction, and prior to reaction with OH functionality from the monohydric alcohol, the modified chlorinated polyolefin resin has an acid value of from 65 to 145 mg KOH/g based on resin solids. The reaction of the chlorinated polyolefin resin and unsaturated polycarboxylic acid and/or acid anhydride generally is conducted in a temperature range of from 60 to 130 degrees Celsius (°C.), typically in a temperature range of from 85° to 115° C. Thereafter, as set forth above, acid and/or anhydride groups of the resulting acid- and/or anhydride-modified chlorinated polyolefin resin are reacted with OH (hydroxyl) functionality from an organic monohydric alcohol, preferably a $C_3$-$C_{18}$ monohydric alcohol, to form an esterified product containing residual acid functionality. The esterification reaction generally is conducted in a temperature range of from 60° to 130° C., typically in a temperature range of from 85° to 115° C. Examples of organic monohydric alcohols which may be utilized include: propanol, isopropanol, n-butanol, isobutyl alcohol, tert-butyl alcohol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, stearyl alcohol and the like.

Acid functionality of the resulting esterified product is reacted with epoxy functionality from a polyepoxide, preferably a diepoxide, in relative amounts as specified below to form the ungelled modified chlorinated polyolefin resin of the invention. The relative amounts of the polyepoxide and the unsaturated polycarboxylic acid and/or anhydride are selected so as to provide a ratio of equivalents of epoxy groups to equivalents of acid groups in the range of from 5.0:1.0 to 1.5:1.0. Examples of polyepoxides which may be utilized include: the generally known polyglycidyl ethers of polyphenols and the hydrogenated derivatives thereof such as, for example, the diglycidylether of bisphenol-A, the diglycidylether of hydrogenated bisphenol-A, EPON 828, EPON 1001 and EPONEX Resin 1510 (4'-isopropylidenedicyclohexanol epichlorohydrin) from Shell Chemical Company; the polyglycidyl ethers of mononuclear polyhydric phenols such as the polyglycidyl ethers of resorcinol, pyrogallol, hydroquinone and pyrocatechol; the polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, dipropylene glycol, tripropylene glycol, propane diols, butane diols, pentane diols, glycerol and 2,2-bis(4-hydroxycyclohexyl)propane, as well as polyepoxides such as HELOXY WC-8006 (a concentrated adduct of liquid epoxy resin and synthetic butadieneacrylonitrile rubber containing 40 percent of the elastomer available from Wilmington Chemical Corporation). Many additional examples of polyepoxides are described in the *Handbook of Epoxy Resins*, Henry Lee and Kris Neville, 1967, McGraw Hill Book Company.

The reaction of acid functionality from the aforesaid esterified product and epoxy functionality from the polyepoxide to form an ungelled modified chlorinated polyolefin resin of the invention generally is conducted in the temperature range of from 60° to 130° C., typically in the range of from 85° to 115° C. The acid/epoxy reaction typically is conducted in the presence of a basic catalyst for this purpose, examples of which include: tertiary amines such as dimethyl cocoamine, triethylamine, pyridine, benzyldimethylamine, N,N-dimethylcyclohexylamine and the like.

Preparation of an ungelled modified chlorinated polyolefin resin of the invention typically is carried out in an organic solvent and/or diluent medium utilizing conventional solution polymerization procedures which are well known in the art. Organic solvents and/or diluents which may be utilized in the polymerization of the monomers include virtually any of the organic solvents and/or diluents heretofore employed for this purpose. Typically, an aromatic organic solvent such as xylene toluene or naphtha is utilized, but other organic solvents and/or diluents may be employed, examples of which include: esters such as n-butyl acetate, ethyl acetate and isobutyl acetate; ether alcohols such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones such as methyl ethyl ketone, methyl n-butyl ketone and methyl isobutyl ketone; and lower alkanols containing 2 to 4 carbon atoms including ethanol, propanol, isopropanol and butanol.

A coating composition of the present invention comprises an ungelled modified chlorinated polyolefin resin which is a reaction product of a chlorinated polyolefin resin, an unsaturated polycarboxylic acid and/or an unsaturated acid anhydride, a monohydric alcohol, and a polyepoxide wherein the polyepoxide and the unsaturated polycarboxylic acid and/or anhydride are employed to provide a ratio of equivalents of epoxy to equivalents of acid in the range of from 5.0:1.0 to 1.5:1.0. Generally, for the aforesaid reaction product, the monohydric alcohol comprises a $C_3$-$C_{18}$ monohydric alcohol, and the polyepoxide comprises a diepoxide.

The relative amounts of the respective components for preparing an ungelled modified chlorinated polyolefin resin of the invention suitable for a composition of the invention may vary widely depending on the intended use of the composition. However, for a coating composition of the invention having a wide range of utility, the relative amounts of chlorinated polyolefin resin, unsaturated polycarboxylic acid and/or unsaturated acid anhydride, monohydric alcohol, and polyepoxide to form the aforesaid reaction product are 92.5 to 78.0 parts by weight, 7.5 to 22.0 parts by weight, 18.4 to 240 parts by weight, and 58.0 to 145 parts by weight, respectively. For certain applications it is preferred to utilize a relative amount of the monohydric alcohol in the range of from 22.7 to 66.0 parts by weight and a relative amount of the polyepoxide in the range of from 58.0 to 145 parts by weight.

For certain preferred embodiments of the invention wherein a composition of the invention is utilized as an adhesion promoting composition for a thermoplastic substrate, it is preferred that the coating composition consist essentially of an ungelled modified chlorinated polyolefin resin which is a reaction product of an amount of from 92.5 to 78.0 parts by weight of a chlorinated polyolefin resin, an amount of from 7.5 to 22.0 parts by weight of an unsaturated polycarboxylic acid and/or an unsaturated acid anhydride, an amount of from 18.4 to 240, more preferably from 22.7 to 66.0, parts by weight of a $C_{3-18}$ monohydric alcohol, and an amount of from 58.0 to 145 parts by weight of a diepoxide, respectively. The polyepoxide and the unsaturated polycarboxylic acid and/or anhydride are employed to provide a ratio of equivalents of epoxy to equivalents of acid in the range of from 5.0:1.0 to 1.5:1.0.

It is to be understood that a composition of the invention may contain an organic solvent and/or diluent. Organic solvents and/or diluents which may be utilized include any of the organic solvents and/or diluents heretofore employed in coating compositions of this general class. Examples of such organic solvents and/or diluents include those set forth previously herein in the description of organic solvents and/or diluents which may be utilized in the preparation of an ungelled modified chlorinated polyolefin resin of the invention.

Compositions of the invention may be utilized as sole film forming compositions on a substrate or they may be utilized, for example, as adhesion promoters between the substrate and a subsequently applied organic film-forming composition. For example, it has been found that compositions of the invention when applied to thermoplastic polyolefin substrates, such as substrates comprised of polyethylene, polypropylene, copolymers of ethylene and propylene and the like, act as excellent adhesion promoters for films from subsequently applied organic coatings such as organic primers and topcoating compositions. Examples of such organic coatings include those based on film-forming thermoplastic and/or thermosetting resins, examples of which resins include the generally known cellulosics, acrylics, aminoplasts, urethanes, polyesters, polyethers, epoxies or mixtures thereof. Such film-forming resins can be employed optionally in combination with various ingredients generally known for use in organic coating compositions containing film-forming resins of these general classes. Examples of these various ingredients include: solvents and/or diluents; fillers; plasticizers; antioxidants; mildewcides and fungicides; surfactants; various flow control agents including, for example, thixotropes and also additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference.

Coating compositions of the invention may be applied to a substrate by any known means, for example, spraying, mist spraying to obtain a desirable dry film thickness (DFT) for adhesion, curtain coating, dipping, roll coating, brushing, doctor blade coating, etc. They may be preliminarily flashed or dried at ambient or elevated temperature to reduce or remove solvent if desired.

Accordingly, the present invention provides a method comprising: (I) applying to a thermoplastic polyolefin substrate, a film of coating composition of the invention containing from 5 to 100 percent, preferably from 5 to 70 percent, and most preferably from 5 to 50 percent by weight of ungelled modified chlorinated polyolefin resin of the invention; and (II) hardening the film on the thermoplastic polyolefin substrate to provide an adherent, organic solvent resistant and humidity resistant coating. As can be appreciated from the discussion previously herein, following application of a coating composition of the invention to the substrate, an organic primer and/or topcoating composition may be, and typically is, applied over the film from the coating composition of the invention. The organic primer and/or topcoating composition may be applied with or without first drying the film of coating composition of the invention.

In a preferred embodiment, the present invention provides a thermoplastic polyolefin substrate having directly adhered to a surface thereof, a hardened film from a coating composition of the invention containing from 5 to 100 percent, preferably from 5 to 70 percent, and most preferably from 5 to 50 percent by weight of ungelled modified chlorinated polyolefin resin of the invention. In a more preferred embodiment, the thermoplastic polyolefin substrate also contains one or more layers of hardened organic primer and/or topcoating composition firmly adhered to, and directly over, the hardened film from the coating composition of the invention.

The following examples illustrate the invention and should not be construed as a limitation on the scope thereof. Unless specifically indicated otherwise, all percentages and amounts are understood to be by weight. Wherever used herein "PBW" means parts by weight.

EXAMPLE 1

This example illustrates the method of preparation of a modified chlorinated polyolefin resin of the invention.

A reaction vessel equipped with stirrer, thermometer and condenser is charged at ambient temperature with 600.0 g chlorinated polyolefin[1], 105.5 g maleic anhydride (1.08 mole, 2.16 equivalents), 70.5 g benzoyl peroxide[2], and 635.4 g xylene. The resulting slurry is heated to 100° C. during which period (between 55°–65° C.) it becomes a homogeneous solution. The temperature is held at 100° C. for 3 hours and the reaction mixture is sampled (137.0 g at 54.3 percent by weight solids and having an acid value of 63.01 mg KOH/g, a chlorine content of 9.02 percent by weight and a free chlorine content of 436 parts per million). Next, 921.5 g bisphenol-A diglycidyl ether[3] and 289.0 g butanol are added to the vessel. The temperature is held at 100° C. for another two hours at the end of which period the reaction mixture is again sampled (134.4 g having an acid value of 21.6 mg KOH/g, an epoxy equivalent weight of 570, a chlorine content of 4,84 percent by weight and a free chlorine content of 7 parts per million). Next, 5.1 g dimethyl cocoamine[4] is added to the vessel and the acid value is monitored until it reaches less than 0.5 (after about 2 to 3 hours). The resulting product is allowed to cool and is thinned with 1501.5 g xylene to a theoretical solids content of 40 percent by weight. The resulting product contains a modified chlorinated polyolefin resin prepared by the method of the invention. The product has a viscosity of 128 centipoise (Brookfield viscosity, No. 2 spindle, 50 rpm), an acid value of 0.2 mg KOH/g, an epoxy equivalent weight of 1244 (theoretical of 1045), a chlorine content of 2.91 percent by weight (theoretical of 2.75% by weight), a free chlorine content of 35 parts per million (ppm) and a Gardner color value of 11–12.

[1] A chlorinated polyolefin (containing about 20.7% by weight chlorine) available as Eastman CP-343-1 from Eastman Chemical Products, Inc.
[2] 50 percent by weight benzoyl peroxide in free-flowing granular form available as CADOX BFF-50 from Noury Chemicals.
[3] Available as EPON 828 from Shell Chemical Company.
[4] Available as ARMEEN DMCD.

EXAMPLE 2

This example illustrates the use of a lower level of maleic anhydride in preparing a modified polyolefin resin of the invention.

A reaction vessel equipped with stirrer, thermometer and condenser is charged at ambient temperature with 700.0 g chlorinated polyolefin[1], 92.8 g maleic anhydride (0.945 mole), 79.3 g benzoyl peroxide[2], and 713.5 g xylene. The resulting slurry is heated to 100° C. The temperature is held at 100° C. and samples are taken every hour for 3 hours (total sample weight is 63.4 g). The acid value of the reaction mixture is 50.8 mg KOH/g, and the chlorine content is 9.55 percent by weight. Next, 517.6 g bisphenol-A diglycidyl ether[3] and 268.8 g butanol are added to the reaction vessel. After heating the mixture to 100° C., the reaction mixture is stirred for 3 hours and samples are taken (total sample weight of 76.2 g with acid value of 25.0 mg KOH/g, epoxy equivalent weight of 1083, and chlorine content of 6.34 percent by weight). At this stage of the reaction, 6.5 g dimethylcocoamine[4] and 1007.6 g xylene are added to the reaction vessel, and the acid value is monitored until it reaches 1 mg KOH/g (after about 6 to 7 hours). The resulting product is thinned with 1737.7 g xylene to a theoretical solids content of 25 percent by weight. The resulting product contains a modified chlorinated polyolefin resin of the invention. The product has a viscosity of 40.3 centipoise (Brookfield viscosity, No. 2 spindle, 100 rpm), an acid value of 0.3 mg KOH/g, an epoxy equivalent weight of 5451, a chlorine content of 2.54 percent by weight, a free chlorine content of 28 ppm and a Gardner color value of 8–9.

[1] A chlorinated polyolefin (containing about 20.7% by weight chlorine) available as Eastman CP-343-1 from Eastman Chemical Products, Inc.
[2] 50 percent by weight benzoyl peroxide in free-flowing granular form available as CADOX BFF-50 from Noury Chemicals.
[3] Available as EPON 828 from Shell Chemical Company.
[4] Available as ARMEEN DMCD.

EXAMPLE 3

This example illustrates the use of a hydrogenated bisphenol-A diglycidyl ether in preparing a modified chlorinated polyolefin resin of the invention.

Chlorinated polyolefin (CP-343-1[1], 200 g), 35.3 g maleic anhydride (0.360 mole), 23.5 g CADOX BFF-50[2] and 211.8 g xylene are charged to a flask equipped with a stirrer, condenser and thermometer and heated to 100° C. After 3 hours, a 57.5 g sample is removed and 376.0 g EPONEX Resin 1510[3] and 93.7 g butanol are added to the reaction flask. The reaction mixture is stirred for 2 hours at 100° C. and sampled (47.8 g with acid value of 19.7 mg KOH/g). Next, 1.89 g of dimethylcocoamine[4] is introduced into the reaction flask and the acid value is monitored until the value is less than 0.5, after which 596.1 g xylene is added to the flask. The resulting product contains a modified chlorinated polyolefin resin of the invention. The product has a solids content of 41.8 percent by weight, a viscosity of 95 centipoise (Brookfield viscosity, No. 2 spindle, 50 rpm), an acid value of 0.03 mg KOH/g, an epoxy equivalent weight of 1433, a chlorine content of 3.93 percent by weight and a free chlorine content of 42 ppm.

[1] A chlorinated polyolefin (containing about 20.7% by weight chlorine) available as Eastman CP-343-1 from Eastman chemical Products, Inc.
[2] 50 percent by weight benzoyl peroxide in free-flowing granular form available as CADOX BFF-50 from Noury Chemicals.
[3] 4,4'-isopropylidenedicyclohexanol epichlorohydrin from Shell Chemical Company.
[4] Available as ARMEEN DMCD.

EXAMPLE 4

This example illustrates the use of an adduct of bisphenol-A diglycidyl ether and carboxy terminated butadiene-acrylonitrile rubber in preparing a modified chlorinated polyolefin resin of the invention.

A reaction flask equipped with a stirrer, thermometer and condenser is charged with 200.0 g CP-343-1[1], 35.3 g maleic anhydride (0.360 mole), 23.5 g CADOX BFF 50[2] and 211.8 g xylene. After heating the resulting slurry to 100° C., the reaction mixture is stirred for 3 hours and sampled (52.2 g removed). Next, 301.9 g HELOXY WC-8006[3] and 94.9 g butanol are added to the reaction vessel, and the resulting reaction mixture is stirred for 2 hours at 100° C. The reaction mixture is sampled (51.2 g with an acid value of 22.6 mg KOH/g and epoxy equivalent weight of 1149), and 487.3 g xylene and 1.65 g dimethylcocoamine[4] are added. After monitoring the acid value of the reaction mixture until it reaches less than 1 mg KOH/g, the reaction mixture is cooled. The resulting product has a solids content of 43.3 percent by weight, a viscosity of 558 centipoise (Brookfield viscosity, NO. 3 spindle, 50 rpm), an acid value of 0.3 mg KOH/g and a chlorine content of 2.84 percent by weight.

[1] A chlorinated polyolefin (containing about 20.7% by weight chlorine) available as Eastman CP-343-1 from Eastman chemical Products, Inc.
[2] 50 percent by weight benzoyl peroxide in free-flowing granular form available as CADOX BFF-50 from Noury Chemicals.
[3] A concentrated adduct of liquid epoxy resin and synthetic butadiene-acrylonitrile rubber containing 40 percent of the elastomer available from Wilmington Chemical Corporation.
[4] Available as ARMEEN DMCD.

EXAMPLE 5

This example illustrates the use of itaconic anhydride as the unsaturated dicarboxylic acid anhydride in preparing a modified chlorinated polyolefin resin of the invention.

A reaction vessel is charged at with 200.0 g chlorinated polyolefin[1], 40.4 g itaconic anhydride (0.360 mole), 23.5 g benzoyl peroxide[2], and 216.9 g xylene, and the charge is heated to 100° C. After 3 hours, a 57.0 g sample is removed (free itaconic anhydride is 0.06 percent determined by high pressure liquid chromatography analysis) and 299.8 g bisphenol-A diglycidyl ether[3] and 94.0 g butanol are added to the reaction vessel. The resulting reaction mixture is stirred for 2 hours and sampled (55.4 g with an acid value of 14.1 mg KOH/g). Next, 1.65 g dimethylcocoamine[4] is added to the reaction vessel, and the acid value is monitored until it reaches less than 0.5 mg KOH/g. When this acid value is reached, the reaction mixture is diluted with 483.4 g xylene. The resulting product contains a chlorinated polyolefin resin of the invention. The product has a solids content of 36.5 percent by weight, a viscosity of 208 centipoise (Brookfield viscosity, No. 2 spindle, 100 rpm), an acid value of 0.1 mg KOH/g, an epoxy equivalent weight of 1628, a chlorine content of 2.48 percent by weight and a free chlorine content of 6 ppm.

[1] A chlorinated polyolefin (containing about 20.7% by weight chlorine) available as Eastman CP-343-1 from Eastman chemical Products, Inc.
[2] 50 percent by weight benzoyl peroxide in free-flowing granular form available as CADOX BFF-50 from Noury Chemicals.
[3] Available as EPON 828 from Shell Chemical Company.
[4] Available as ARMEEN DMCD.

EXAMPLE 6

This example illustrates the use of ethanol as the monohydric alcohol for preparing a modified chlorinated polyolefin resin.

Chlorinated polyolefin (CP-343-1[1], 200 g), 35.3 g maleic anhydride (0.360 mole), 23.5 g CADOX BFF-50[2] and 211.8 g xylene are charged to a reaction flask equipped with a stirrer, condenser and thermometer and the resulting slurry is heated to 100° C. After the reaction mixture is stirred for 3 hours and sampled (57.6 g), 298.5 g bisphenol-A diglycidyl ether[3] and 58.2 g ethanol are added to the reaction flask. The reaction mixture is stirred for 2 more hours. At the end of this period, the reaction mixture is sampled (55.5 g); 1.59 g dimethylcocoamine[4] is added; and the acid value is monitored. Within two hours the reaction mixture becomes very viscous and gells before 3 hours has passed.

[1] A chlorinated polyolefin (containing about 20.7% by weight chlorine) available as Eastman CP-343-1 from Eastman chemical Products, Inc.
[2] 50 percent by weight benzoyl peroxide in free-flowing granular form available as CADOX BFF-50 from Noury Chemicals.
[3] Available as EPON 828 from Shell Chemical Company.
[4] Available as ARMEEN DMCD.

Accordingly, it is particularly preferred to utilize for the monohydric alcohol, an alcohol having at least 3 carbon atoms.

EXAMPLE 7

This example illustrates coating compositions employing a modified chlorinated polyolefin adhesion promoter of this invention and a comparative composition which is a blend of chlorinated polyolefin and bisphenol-A diglycidyl ether. It also illustrates performance properties from cured films prepared from the respective compositions.

(a) Two compositions (I and II) for utilization as adhesion promoters are prepared by mixing the ingredients as set forth in the following Table 1. Composition II is a comparative composition.

TABLE 1

| Components of Adhesion Promoter Composition | Mass (grams) | |
|---|---|---|
| | I | II |
| Resulting Product of Example 1 | 233.1 | 0 |
| Chlorinated polyolefin | 0 | 37.0 |
| Bisphenol-A diglycidyl ether | 0 | 63.0 |
| Xylene | 766.9 | 900.0 |
| Total Mass | 1000.0 | 1000.0 |
| Mass of Solids | 100.0 | 100.0 |

(b) The above two adhesion promoter compositions (I and II) are applied as a mist to a thermoplastic polyolefin substrate (available as ETA 3041 from Republic Plastics). The resulting "mist coats" are allowed to flash for 5 minutes at room temperature. Immediately thereafter, the mist coats are topcoated first with 0.8 mil of a white universal basecoating composition (available as CBC-8554 from PPG Industries, Inc.) and next, wet-on-wet (i.e., before allowing the basecoat to dry), with 1.5 mil of a transparent universal clearcoating composition (available as UCC-1000 from PPG Industries, Inc.). The resulting composite films are baked for 30 minutes at 250° F.

The resultant properties for the cured, composite films are as set forth in the following Table 2. The following terms and abbreviations in Table 2 have the meanings set forth below.

"DFT" means dry film thickness in mills.

"Knife" refers to resistance of the composite film (coating) to being scraped off the substrate with a knife edge. Subjective ratings are "very good", "good", "fair", "poor" and "fail".

"Crosshatch" refers to adhesion of the composite film to the substrate one hour after baking determined according to ASTM test method D 3359. The values for this test range from 0 to 5. A value of 5 means that there was no adhesion failure (or no "pickoff") of the composite coating in any manner.

"Solvent Soak" means resistance in minutes of the composite film (coating) to "lifting" from the substrate. An "X" is scribed into the film and down into the substrate which is thereafter immersed in a 50/50 mixture (by volume) of toluene and VM & P naphtha.

"Crosshatch-H" refers to crosshatch adhesion of the composite film to the substrate after 100 hours in a humidity chamber operating at 100 percent relative humidity and 37.8 degrees Celsius (°C).

TABLE 2

| Composition | DFT | Knife | Crosshatch | Solvent Soak | Crosshatch-H |
|---|---|---|---|---|---|
| Promoter I | 0.07 | Very good | 5 | >60 | 5 |
| Promoter II | 0.06 | Good | 5 | 10 | 0 |

As can be seen from the results summarized in Table 2 above, adhesion promoter composition I, utilizing the modified chlorinated polyolefin resin product of the invention from Example 1, results in a cured film adhered to the thermoplastic polyolefin substrate which film has much better solvent resistance properties and humidity resistance properties than the cured film from the comparative adhesion promoter composition.

What is claimed is:

1. An ungelled modified chlorinated polyolefin resin prepared by free radically grafting one or more compounds selected from unsaturated polycarboxylic acids and their acid anhydrides onto a chlorinated polyolefin resin to form an acid- and/or anhydride-modified chlorinated polyolefin resin, and thereafter reacting acid and/or anhydride groups of said acid- and/or anhydride-modified chlorinated polyolefin resin with OH functionality from a C3–C18 monohydric alcohol to form an esterified product containing acid functionality, and reacting acid functionality of said esterified product with epoxy functionality from a polyepoxide to form said ungelled modified chlorinated polyolefin resin, provided that said polyepoxide and said unsaturated polycarboxylic acid and/or anhydride are employed to provide a ratio of equivalents of epoxy to equivalents of acid in the range of from 5.0:1.0 to 1.5:1.0.

2. The modified chlorinated polyolefin resin of claim 1 wherein said polyepoxide comprises a diepoxide.

3. The modified chlorinated polyolefin resin of claim 1 wherein said acid- and/or anhydride-modified chlorinated polyolefin resin has an acid value of from 65 to 145 based on resin solids prior to reaction with OH functionality from said monohydric alcohol.

4. A method of modifying a chlorinated polyolefin resin comprising: free radically grafting one or more compounds selected from unsaturated polycarboxylic acids and their acid anhydrides onto a chlorinated polyolefin resin to form an acid- and/or anhydride-modified chlorinated polyolefin resin, and thereafter reacting acid and/or anhydride groups of said acid- and/or anhydride-modified chlorinated polyolefin resin with OH functionality from a C3–C18 monohydric alcohol to form an esterified product containing acid functionality, and reacting acid functionality of said esterified product with epoxy functionality from a polyepoxide to form an ungelled modified chlorinated polyolefin resin.

5. The method of claim 4 wherein said polyepoxide and said unsaturated polycarboxylic acid and/or anhydride are employed to provide a ratio of equivalents of epoxy to equivalents of acid in the range of from 5.0:1.0 to 1.5:1.0.

6. The method of claim 4 wherein said polyepoxide comprises a diepoxide.

7. The method of claim 4 wherein said acid- and/or anhydride-modified chlorinated polyolefin resin has an acid value of from 65 to 145 based on resin solids prior to reaction with OH functionality from said monohydric alcohol.

* * * * *